United States Patent
Kusayanagi et al.

(10) Patent No.: US 10,864,856 B2
(45) Date of Patent: Dec. 15, 2020

(54) MOBILE BODY SURROUNDINGS DISPLAY METHOD AND MOBILE BODY SURROUNDINGS DISPLAY APPARATUS

(71) Applicant: Nissan Motor Co., Ltd., Yokohama (JP)

(72) Inventors: Yoshinori Kusayanagi, Kanagawa (JP); Takura Yanagi, Kanagawa (JP); Seigo Watanabe, Kanagawa (JP); Norimasa Kishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/092,334

(22) PCT Filed: Apr. 14, 2016

(86) PCT No.: PCT/JP2016/062014
§ 371 (c)(1),
(2) Date: Oct. 9, 2018

(87) PCT Pub. No.: WO2017/179174
PCT Pub. Date: Oct. 19, 2017

(65) Prior Publication Data
US 2019/0337455 A1 Nov. 7, 2019

(51) Int. Cl.
*H04N 7/00* (2011.01)
*B60R 1/00* (2006.01)
*H04N 7/18* (2006.01)
*G08G 1/16* (2006.01)

(52) U.S. Cl.
CPC .............. *B60R 1/002* (2013.01); *H04N 7/18* (2013.01); *G08G 1/165* (2013.01); *G08G 1/166* (2013.01); *G08G 1/168* (2013.01)

(58) Field of Classification Search
CPC .......... B60R 1/002; H04N 7/18; G08G 1/165; G08G 1/166; G08G 1/168
See application file for complete search history.

(56) References Cited

U.S. PATENT DOCUMENTS 7,734,417 B2  6/2010 Chinomi et al.
7,796,841 B2  9/2010 Paillet et al.
(Continued)

FOREIGN PATENT DOCUMENTS

CN  1865849 A   11/2006
EP  1725035 A1  11/2006
(Continued)

*Primary Examiner* — Zhihan Zhou
(74) *Attorney, Agent, or Firm* — Young Basile Hanlon & MacFarlane, P.C.

(57) ABSTRACT

A mobile body surroundings display method is performed by a mobile body surroundings display apparatus that includes an image capturing element that acquires surroundings information on a mobile body by image capturing, a controller that creates a captured image using the surroundings information and a virtual image representing a situation around the mobile body, and a display that displays the virtual image. The method detects an attention-required range around the mobile body, creates a captured image of the attention-required range, and displays the captured image of the attention-required range on the display.

6 Claims, 16 Drawing Sheets

(56) References Cited

U.S. PATENT DOCUMENTS

| | | | | |
|---|---|---|---|---|
| 2007/0003108 A1* | 1/2007 | Chinomi | ............... | B60R 1/00 382/104 |
| 2007/0014469 A1 | 1/2007 | Paillet et al. | | |
| 2008/0273755 A1* | 11/2008 | Hildreth | ............... | G06F 1/1626 382/103 |
| 2009/0109216 A1* | 4/2009 | Uetabira | ............ | G06F 16/9577 345/419 |
| 2012/0249789 A1* | 10/2012 | Satoh | ............... | G06K 9/00832 348/143 |
| 2012/0287277 A1* | 11/2012 | Koehrsen | ............... | B60R 1/00 348/148 |
| 2013/0010118 A1* | 1/2013 | Miyoshi | ............... | B60R 1/00 348/148 |
| 2015/0070157 A1* | 3/2015 | Murayama | ............ | B60K 35/00 340/435 |
| 2015/0138099 A1* | 5/2015 | Major | ............... | A63F 13/211 345/173 |

FOREIGN PATENT DOCUMENTS

| | | |
|---|---|---|
| EP | 2555519 A1 | 2/2013 |
| EP | 2911041 A1 | 8/2015 |
| JP | H06278531 A | 10/1994 |
| JP | 2001023091 A | 1/2001 |
| JP | 2007329793 A | 12/2007 |
| JP | 2012053533 A | 3/2012 |
| JP | 2012176748 A | 9/2012 |
| JP | 2013255237 A | 12/2013 |
| RU | 2008102837 A | 8/2009 |
| WO | 2011135778 A1 | 11/2011 |

\* cited by examiner

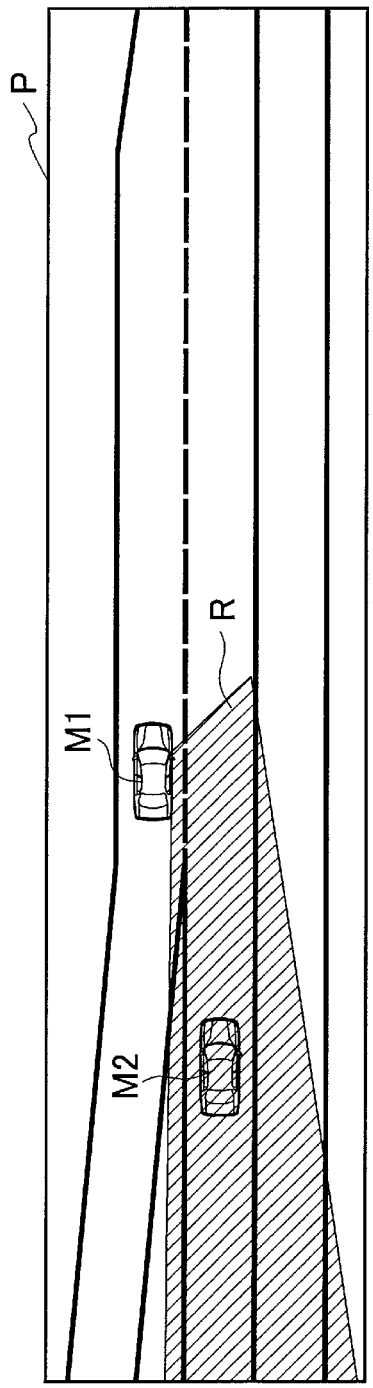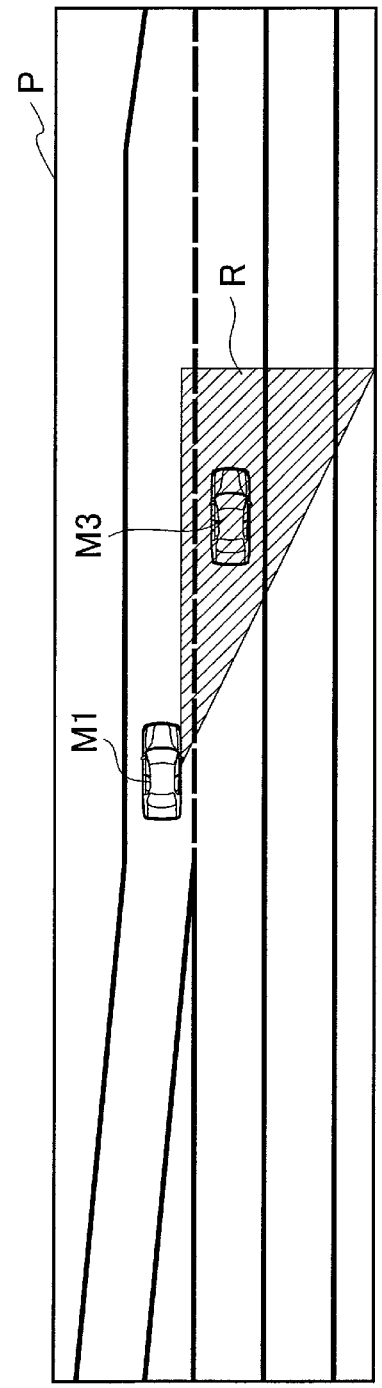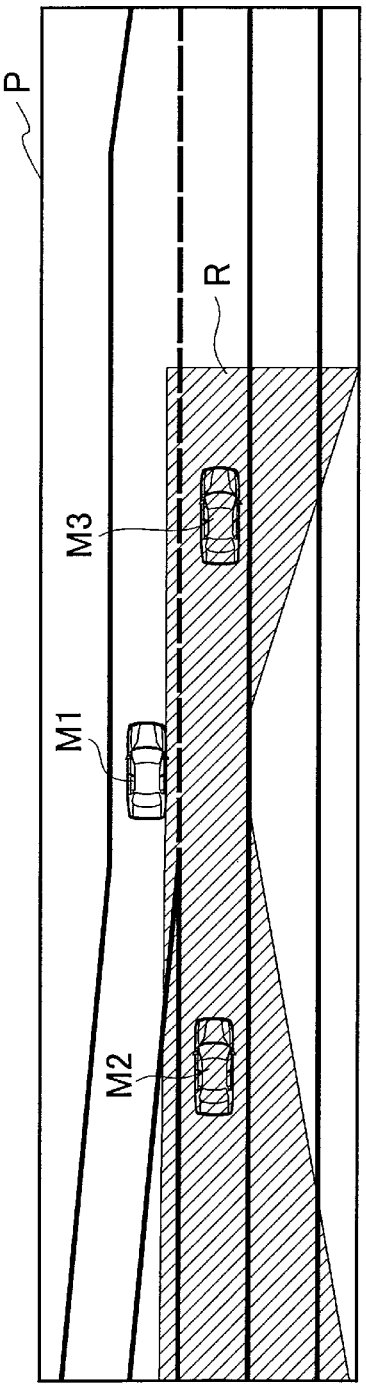

US 10,864,856 B2

MOBILE BODY SURROUNDINGS DISPLAY METHOD AND MOBILE BODY SURROUNDINGS DISPLAY APPARATUS

TECHNICAL FIELD

The present invention relates to a mobile body surroundings display method and a mobile body surroundings display apparatus.

BACKGROUND

There is conventionally known a technique for detecting an attention-required object in the travelling direction of a vehicle and informing the driver of the attention-required object detected. In Japanese Patent Application Publication No. 2001-23091, a detected attention-required object is displayed on a head-up display.

In Japanese Patent Application Publication No. 2001-23091, an attention-required object is displayed on a head-up display as an icon. Thus, information that an occupant has empirically acquired during normal driving, such as the attribute of the attention-required object (whether the object is an elderly person or a child) and the eye direction of the object, may be lost.

SUMMARY

The present invention has been made in view of the above problem and has an objective to provide a mobile body surroundings display method and a mobile body surroundings display apparatus capable of informing an occupant of details of information to which attention needs to be paid.

A mobile body surroundings display method according to an aspect of the present invention acquires surroundings information on a mobile body by image capturing, creates a captured image using the surroundings information acquired and a virtual image representing a situation around the mobile body, detects an attention-required range around the mobile body, creates a capture image of the attention-required range detected, and displays the captured image of the attention-required range on a display.

The present invention displays a captured image of an attention-required range on a display, and therefore allows an occupant to be informed of details of information to which attention needs to be paid.

BRIEF DESCRIPTION OF THE DRAWINGS

FIGS. 4A, 4B, and 4C are diagrams illustrating yet another example of synthesis of a virtual image with a camera image according to the first embodiment of the present invention;

DETAILED DESCRIPTION

Figure 1:
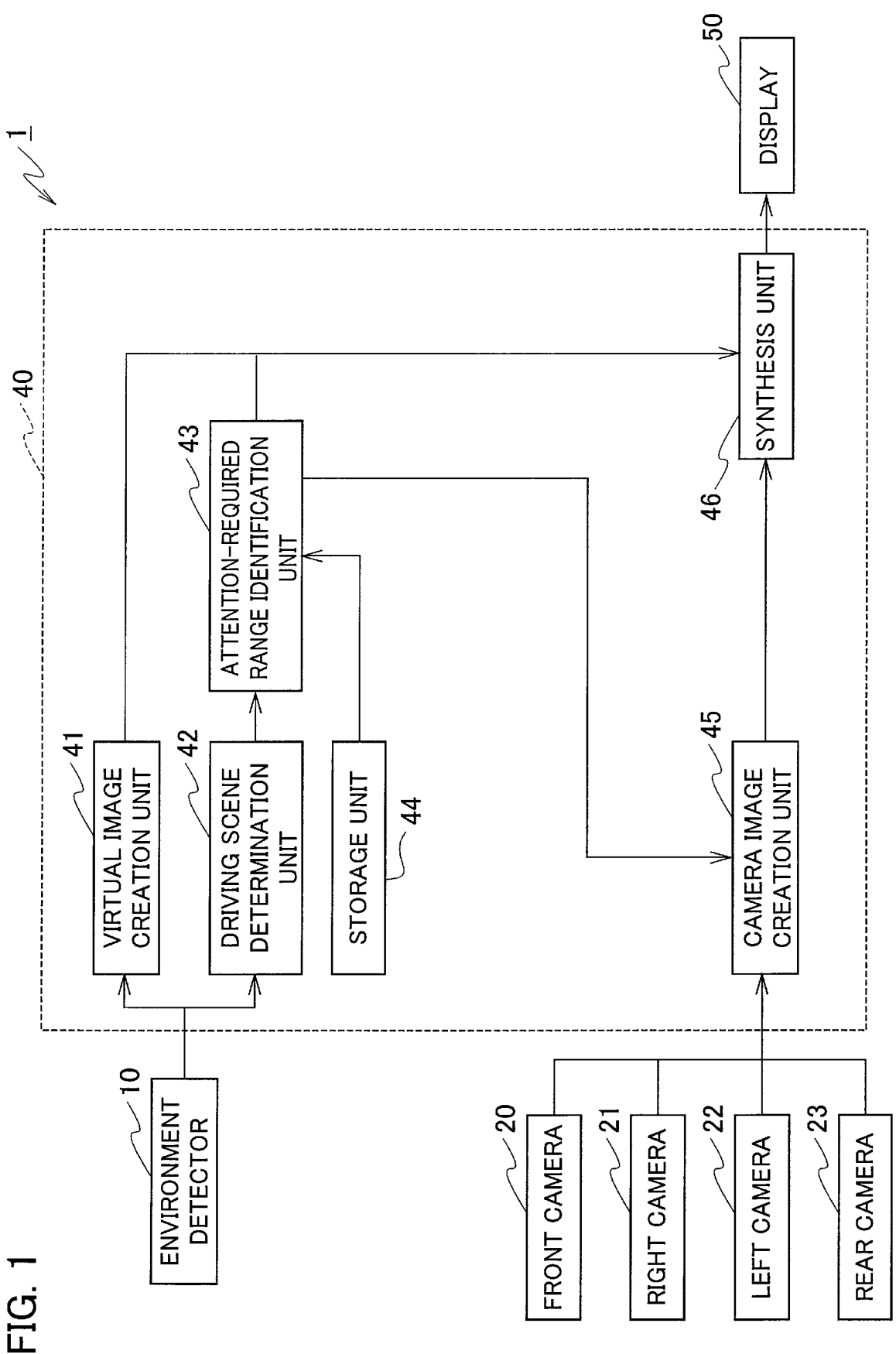
FIG. 1 is a diagram of the configuration of a mobile body surroundings display apparatus according to a first embodiment of the present invention.

Embodiments of the present invention are described below with reference to the drawings. Throughout the drawings, the same portions are denoted by the same reference numerals and are not described repeatedly.

First Embodiment

A mobile body surroundings display apparatus 1 according to a first embodiment is described with reference to FIG. 1. As illustrated in FIG. 1, the mobile body surroundings display apparatus 1 includes an environment detector 10, a front camera 20, a right camera 21, a left camera 22, a rear camera 23, a controller 40, and a display 50. Note that the mobile body surroundings display apparatus 1 is an apparatus mainly used for an autonomous driving vehicle with autonomous driving capability.

The environment detector 10 is a device that detects the environment surrounding the host vehicle, and is, for example, a laser range finder. A laser range finder detects obstacles (such as a pedestrian, a bicycle, a two-wheel vehicle, and a different vehicle) located around (e.g., within 30 meters from) the host vehicle. Instead, an infrared sensor, an ultrasonic sensor, or the like may be used as the environment detector 10, or a combination of these may constitute the environment detector 10. Further, the environment detector 10 may be configured including cameras such as the front camera 20 and the rear camera 23 to be described later, or including a different camera. Also, the environment detector 10 may be configured including a GPS receiver. The environment detector 10 can transmit information on the position of the host vehicle received with the GPS receiver to a cloud and receive map information around the host vehicle from the cloud. The environment detector 10 outputs detected environment information to the controller 40. In addition, the environment detector 10 does not necessarily have to be provided to the host vehicle, and data detected by a sensor installed outside the vehicle may be acquired through wireless communication. In other words, the environment detector 10 may detect the environment surrounding the host vehicle through wireless communication with other vehicles (vehicle-to-vehicle communication) or wireless communication with obstacles and intersections (vehicle-to-infrastructure communication).

The front camera 20, the right camera 21, the left camera 22, and the rear camera 23 are each a camera having an image capturing element such as a charge-coupled device (CCD) or a complementary metal-oxide semiconductor (CMOS). Hereinbelow, the four cameras, namely the front camera 20, the right camera 21, the left camera 22, and the rear camera 23, are collectively referred to as "vehicle cameras 20 to 23". The vehicle cameras 20 to 23 acquire surroundings information on the host vehicle by capturing images of the front side, the right side, the left side, and the back side of the host vehicle, respectively, and output the acquired surroundings information to the controller 40.

The controller 40 is a circuit that processes information acquired from the environment detector 10 and the vehicle cameras 20 to 23, and is configured with, for example, an IC, an LSI, or the like. The controller 40, when seen functionally, can be classified into a virtual image creation unit 41, a driving scene determination unit 42, an attention-required range identification unit 43, a storage unit 44, a camera image creation unit 45, and a synthesis unit 46.

The virtual image creation unit 41 creates a virtual image representing the surrounding situation of the host vehicle using information acquired from the environment detector 10. In the first embodiment, a virtual image is a computer graphic image obtained by three-dimensional mapping of, for example, geographic information, obstacle information, road sign information, and the like, and is different from a camera image to be described later. The virtual image creation unit 41 outputs the created virtual image to the synthesis unit 46.

The driving scene determination unit 42 determines the current driving scene using information acquired from the environment detector 10. Examples of driving scenes determined by the driving scene determination unit 42 include a regular travelling scene, a parking scene, a scene where the host vehicle merges onto an expressway, and a scene where the host vehicle enters an intersection. The driving scene determination unit 42 outputs the determined driving scene to the attention-required range identification unit 43.

Based on the driving scene determine by the driving scene determination unit 42, the attention-required range identification unit 43 identifies an area to which an occupant needs to pay attention (hereinafter referred to as an attention-required range). More specifically, the attention-required range identification unit 43 identifies an attention-required range using a database stored in the storage unit 44. Although a description will be given later of an attention-required range, the attention-required range is, in a side-by-side parking scene for example, a region from the vicinity of the rear wheel on the inner side of turning, to the back of the host vehicle, to the front of the host vehicle on the right side, and in a parallel parking scene, a region around the host vehicle including its front and rear wheels. In the storage unit 44, attention-required ranges according to driving scenes are stored in advance. The attention-required range identification unit 43 outputs the identified attention-required range to the camera image creation unit 45 and the synthesis unit 46.

Using information acquired from the vehicle cameras 20 to 23, the camera image creation unit 45 creates a camera image (a captured image) of an attention-required range identified by the attention-required range identification unit 43. The camera image creation unit 45 outputs the created camera image to the synthesis unit 46. Although the vehicle cameras are used for the captured image in the present embodiment, the vehicle cameras are not limited to particular types, and may be any cameras such as color cameras, monochrome cameras, infrared cameras, or radio cameras.

The synthesis unit 46 replaces an attention-required range on a virtual image with a camera image. The synthesis unit 46 then outputs the thus-synthesized image to the display 50.

The display 50 is, for example, a liquid crystal display installed in an instrument panel or a liquid crystal display used in a car navigation apparatus, and presents various pieces of information to an occupant.

Next, with reference to FIGS. 2 to 5, examples of camera image synthesis for various driving scenes are described.

Figure 2A:
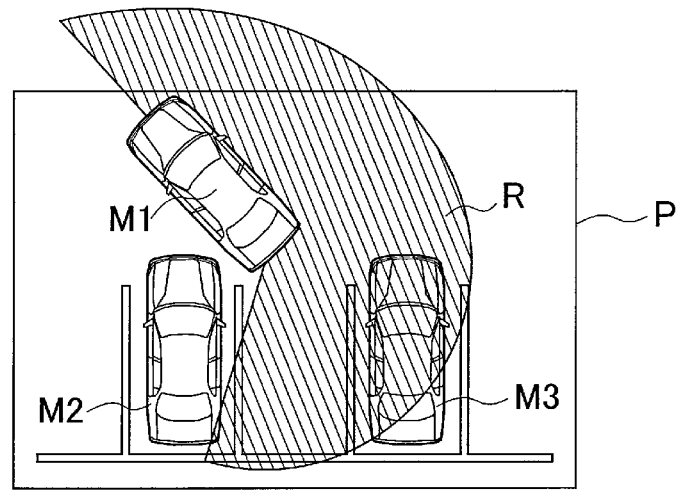
FIGS. 2A and 2B are diagrams illustrating an example of synthesis of a virtual image with a camera image according to the first embodiment of the present invention.

The driving scene illustrated in FIG. 2A is a scene where a host vehicle M1 parks side by side between a different vehicle M2 and a different vehicle M3. An attention-required range for a case of side-by-side parking is, as indicated by the region R, a region from the vicinity of the rear wheel on the inner side of turning, to the back of the host vehicle, to the front of the host vehicle on the right side, and is a range where the host vehicle M1 may travel. The attention-required range identification unit 43 identifies the region R as an attention-required range, and the camera image creation unit 45 creates a camera image of the region R. Then, the synthesis unit 46 replaces the region R on a virtual image P with the camera image. Thereby, the display 50 displays the region R to which an occupant needs to pay attention with the camera image, i.e., an actual captured image. Thus, the occupant can be informed of detailed information about the region R.

Figure 2B:
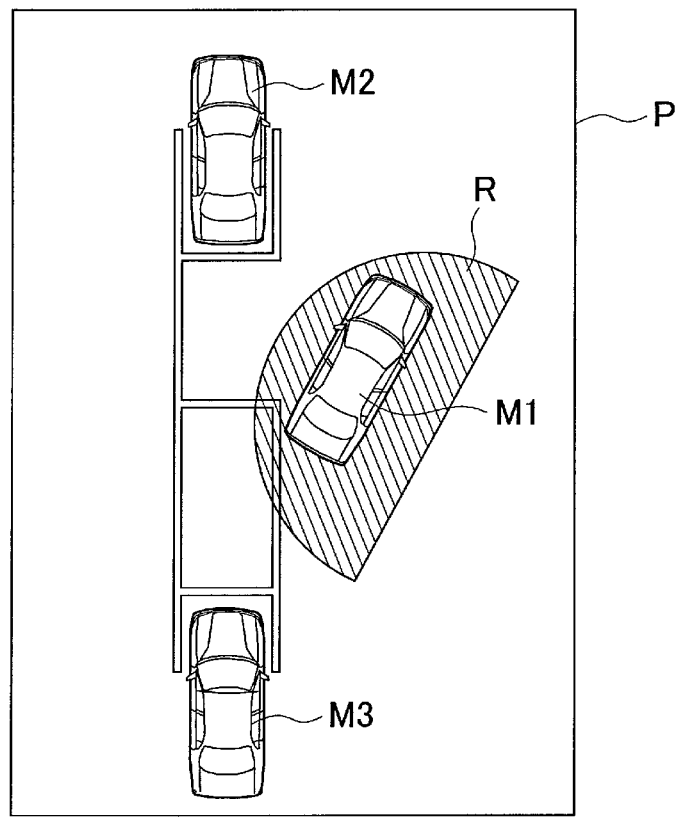

Next, with reference to FIG. 2B, a description is given of a driving scene in which a host vehicle M1 performs parallel parking between a different vehicle M2 and a different vehicle M3. An attention-required range for a case of parallel parking is, as indicated by the region R, a region around the vehicle including its front and rear wheels. The attention-required range identification unit 43 identifies the region R as an attention-required range, and the camera image creation unit 45 creates a camera image of the region R. The following processing is the same as that described in connection to FIG. 2A, and will therefore not be described here.

Figure 3A:
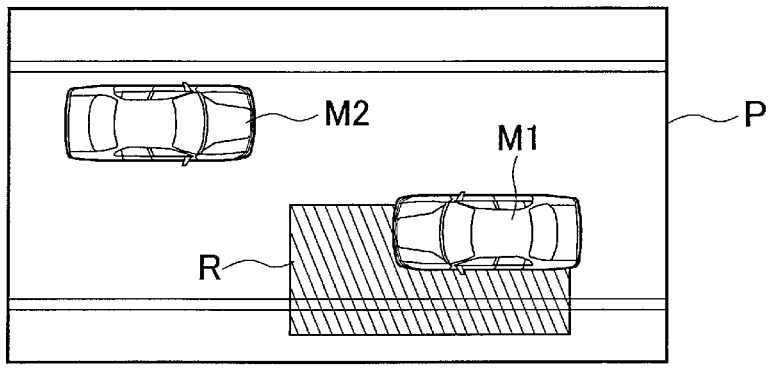
FIGS. 3A, 3B, and 3C are diagrams illustrating another example of synthesis of a virtual image with a camera image according to the first embodiment of the present invention.

Next, with reference to FIG. 3A, a description is given of a driving scene where a host vehicle M1 diverts to the left to avoid colliding with a different vehicle M2 while travelling a narrow road. An attention-required range for a case of diverting to the left on a narrow road is, as indicated by the region R, a region covering the front and the left side of the host vehicle. The attention-required range identification unit 43 identifies the region R as an attention-required range, and the camera image creation unit 45 creates a camera image of the region R. The following processing is the same as described in connection to FIG. 2A, and will therefore not be described here. In addition, the attention-required range identification unit 43 may identify, as an attention-required range, a region where the host vehicle M1 gets close to the different vehicle M2 when passing by the different vehicle M2.

Figure 3B:
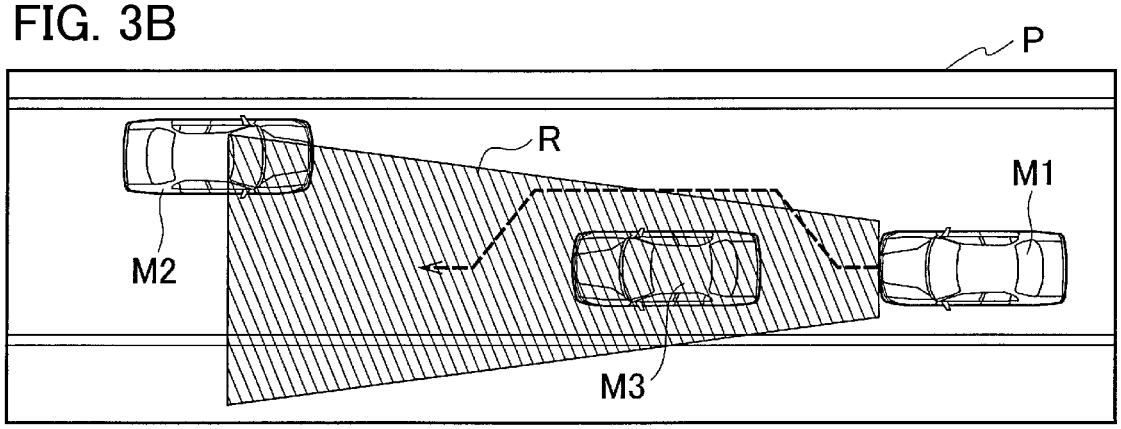

Next, with reference to FIG. 3B, a description is given of a letter-S travelling scene where a host vehicle M1 travelling a narrow road avoids a parked different vehicle M3. An attention-required range for a case of letter-S travelling on a narrow road is, as indicated by the region R, a region covering both the left and right sides of the different vehicle M3 and the front of the host vehicle including the positions where the tires touch the ground. Note that the region R may include an oncoming different vehicle M2. Further, the attention-required range identification unit 43 may set, as an attention-required range, a region where the oncoming vehicle travels within in a region where the host vehicle M1 travels to avoid the parked vehicle. The attention-required range identification unit 43 identifies the region R as an attention-required range, and the camera image creation unit 45 creates a camera image of the region R. The following processing is the same as that described in connection to FIG. 2A, and will therefore not be described here.

Figure 3C:
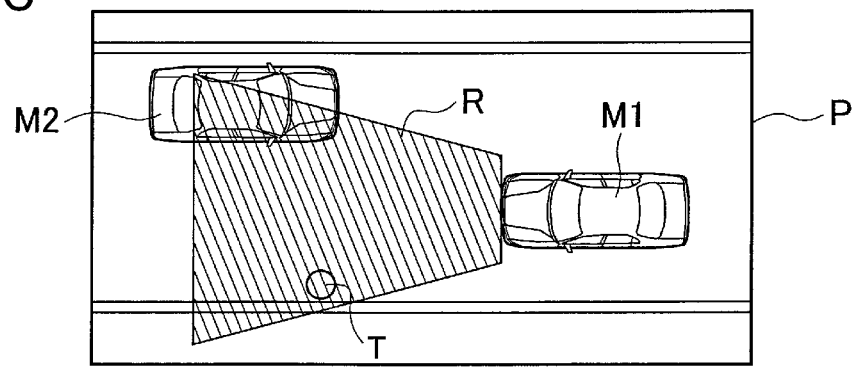

Next, with reference to FIG. 3C, a description is given of a driving scene where a host vehicle M1 travelling a narrow road passes the narrowest place (hereinafter referred to as a narrowest part) due to the presence of a telephone pole T or the like. An attention-required range for a case of passing the narrowest part is, as indicated with the region R, a region covering the front of the vehicle including the width of the narrowest part (the width of the road between a different vehicle M2 and the telephone pole T). The attention-required range identification unit 43 identifies the region R as an attention-required range, and the camera image creation unit 45 creates a camera image of the region R. The following processing is the same as that described in connection to FIG. 2A, and will therefore not be described here.

Next, with reference to FIG. 4A, a description is given of a driving scene where a host vehicle M1 merges onto an expressway with a different vehicle M2 behind. An attention-required range for such a driving scene is, as indicated with the region R, a region from the right side of the host vehicle to a region therebehind. The attention-required range identification unit 43 identifies the region R as an attention-required range, and the camera image creation unit 45 creates a camera image of the region R. The following processing is the same as that described in connection to FIG. 2A, and will therefore not be described here. Note that the attention-required range for the driving scene illustrated in FIG. 4A may be a range reflected in the right door mirror of the host vehicle.

Next, with reference to FIG. 4B, a description is given of a driving scene where a host vehicle M1 merges onto an expressway with a different vehicle M3 in front. An attention-required range for such a driving scene is, as indicated with the region R, a region ahead of the right side of the host vehicle. The attention-required range identification unit 43 identifies the region R as an attention-required range, and the camera image creation unit 45 creates a camera image of the region R. The following processing is the same as that described in connection to FIG. 2A, and will therefore not be described here.

Next, with reference to FIG. 4C, a description is given of a driving scene where a host vehicle M1 merges onto an expressway with a different vehicle M2 behind and a different vehicle M3 in front. An attention-required range for such a driving scene is, as indicated with the region R, a region ahead of and behind the right side of the host vehicle. The attention-required range identification unit 43 identifies the region R as an attention-required range, and the camera image creation unit 45 creates a camera image of the region R. The following processing is the same as that described in connection to FIG. 2A, and will therefore not be described here.

Figure 5:
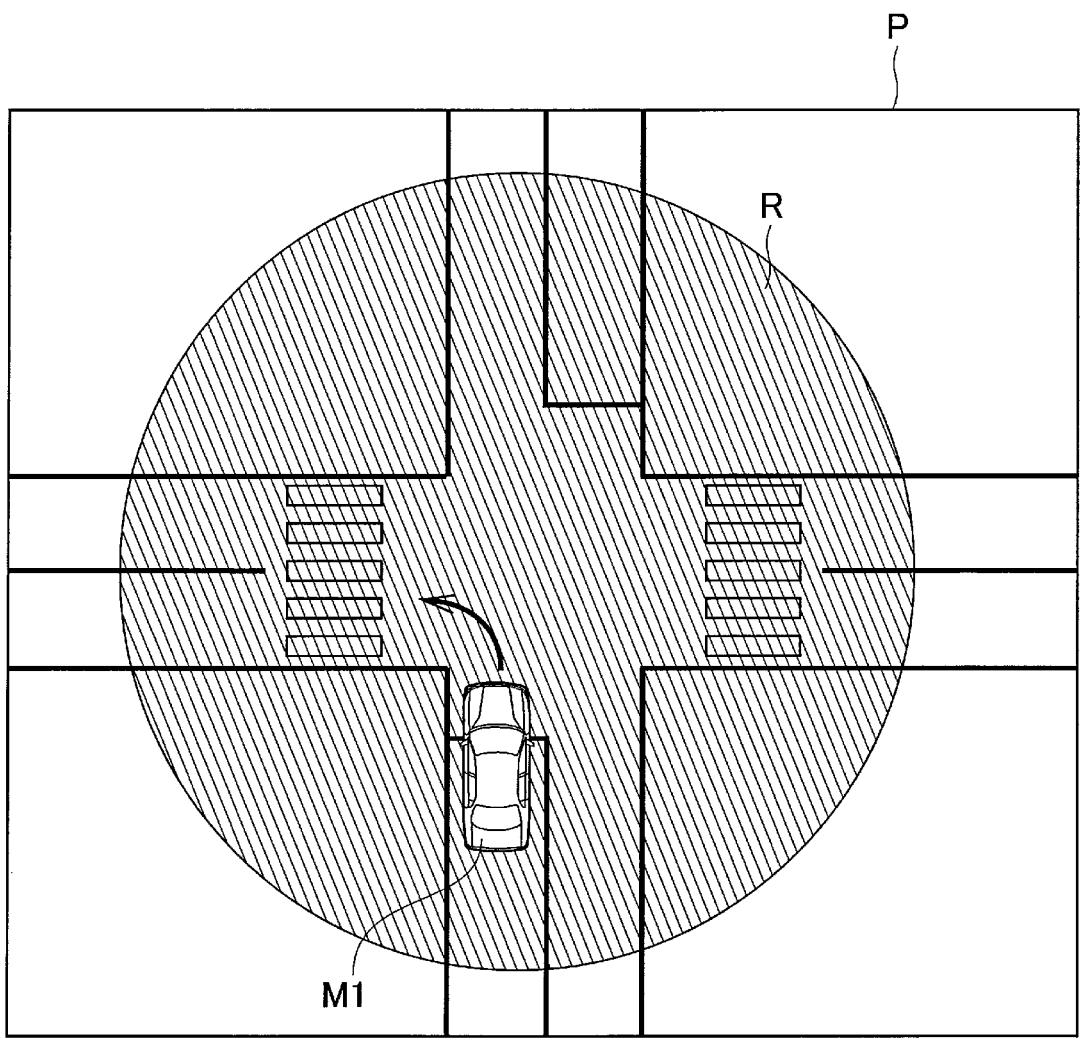
FIG. 5 is a diagram illustrating still another example of synthesis of a virtual image with a camera image according to the first embodiment of the present invention.

Next, with reference to FIG. 5, a description is given of a driving scene where a host vehicle M1 takes a left turn at an intersection. An attention-required range for a case of taking a left turn at an intersection is, as indicated with the region R, a region of the entire intersection including the travelling direction (the left-turn direction) of the host vehicle M1. The attention-required range identification unit 43 identifies the region R as an attention-required range, and the camera image creation unit 45 creates a camera image of the region R. The following processing is the same as that described in connection to FIG. 2A, and will therefore not be described here.

Figure 6:
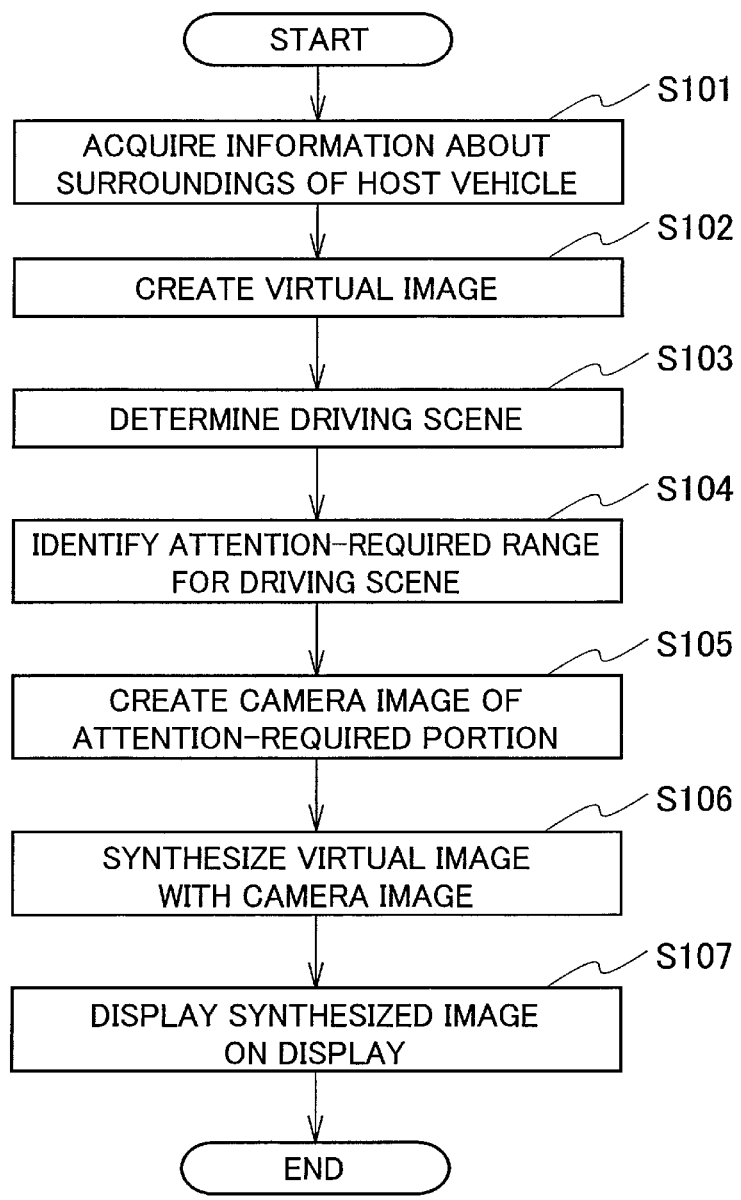
FIG. 6 is a flowchart illustrating an example operation of the mobile body surroundings display apparatus according to the first embodiment of the present invention.

Next, an example operation of the mobile body surroundings display apparatus 1 is described with reference to the flowchart in FIG. 6. This flowchart is initiated when, for example, an ignition switch is turned on.

In Step S101, the environment detector 10 and the vehicle cameras 20 to 23 acquire information about the surroundings of the host vehicle.

In Step S102, the virtual image creation unit 41 creates a virtual image using the information about the surroundings of the host vehicle.

In Step S103, the driving scene determination unit 42 determines a driving scene using the information about the surroundings of the host vehicle.

In Step S104, based on the driving scene determined by the driving scene determination unit 42, the attention-required range identification unit 43 identifies an attention-required range using the database in the storage unit 44.

In Step S105, the camera image creation unit 45 creates a camera image of the attention-required range identified by the attention-required range identification unit 43.

In Step S106, the synthesis unit 46 replaces the attention-required range on the virtual image with the camera image.

In Step S107, the controller 40 displays the synthesized image synthesized by the synthesis unit 46 on the display 50.

The mobile body surroundings display apparatus 1 according to the first embodiment as described above can produce the following advantageous effects.

The mobile body surroundings display apparatus 1 first creates a virtual image using information about the surroundings of the host vehicle. Next, the mobile body surroundings display apparatus 1 identifies an attention-required range based on a driving scene, and creates a camera image of the attention-required range identified. Then, the mobile body surroundings display apparatus 1 replaces the attention-required range on the virtual image with the camera image, and displays the thus-synthesized image on the display 50. Thereby, an occupant can be informed of detailed information on the attention-required range.

Earlier, the mobile body surroundings display apparatus 1 has been described as an apparatus mainly used for an autonomous driving vehicle with autonomous driving capability. When many pieces of information are given to an occupant during autonomous driving, the occupant may find them bothersome. The mobile body surroundings display apparatus 1, however, displays a virtual image except for an attention-required range, and thus can reduce the amount of information given to an occupant. Thus, the mobile body surroundings display apparatus 1 can bother an occupant less. By thus displaying an attention-required range with a camera image and displaying a region other than the attention-required range with a virtual image, the mobile body surroundings display apparatus 1 can give an occupant detailed information for a region to which the occupant needs to pay attention (an attention-required range), and reduce excessive information for a region other than the attention-required range. Thereby, the occupant can correctly acquire only necessary information.

As illustrated in FIGS. 2 to 5, attention-required ranges are places on a road such as a point of mergence to an expressway where a vehicle and a vehicle travel across each other and an intersection where a vehicle and a person travel across each other. An occupant needs to pay attention in such places. Since the mobile body surroundings display apparatus 1 replaces an attention-required range on a virtual image with a camera image and displays the thus-synthesized image, an occupant can be informed of detailed information on the attention-required range.

Second Embodiment

Figure 7:
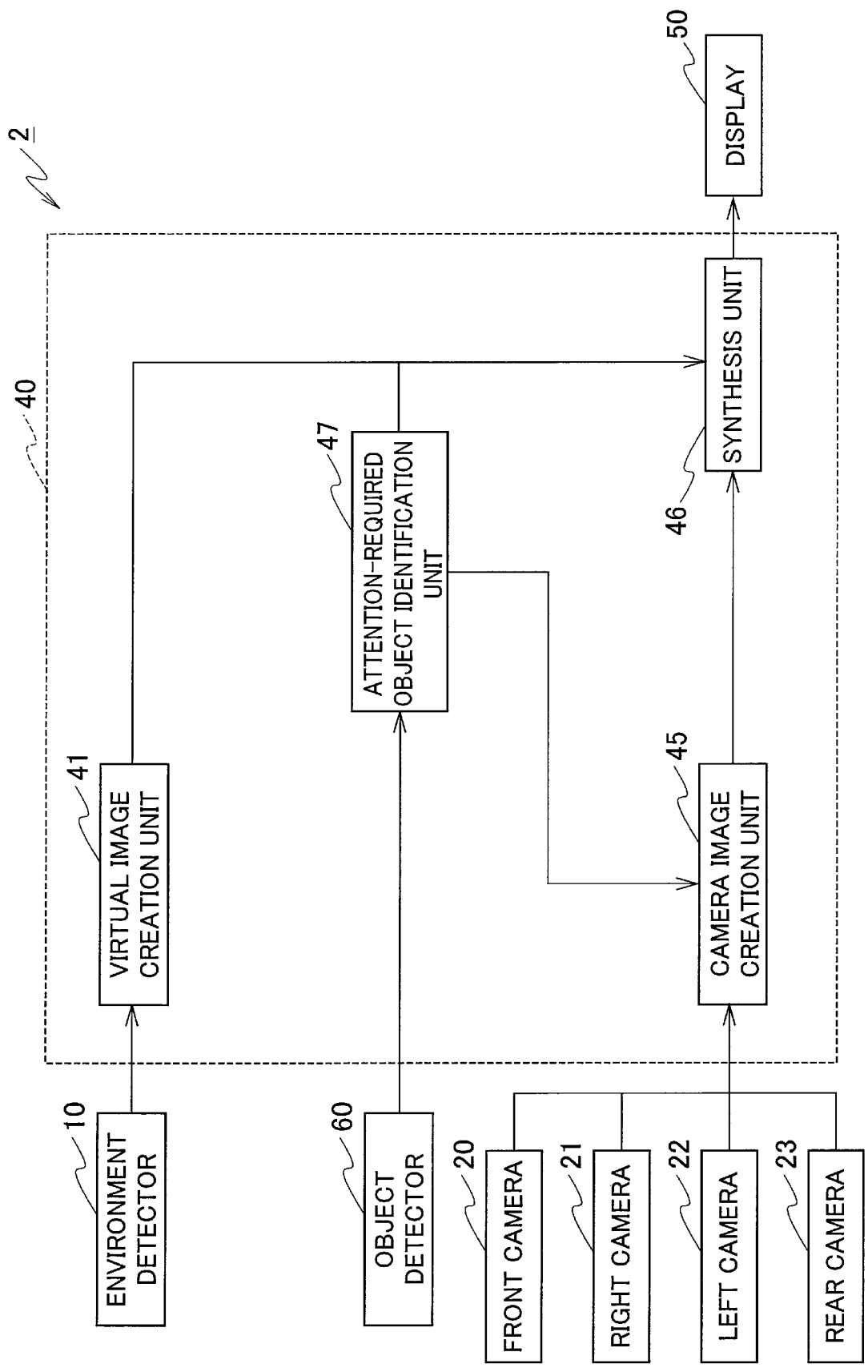
FIG. 7 is a diagram of the configuration of a mobile body surroundings display apparatus according to a second embodiment of the present invention.

Next, with reference to FIG. 7, a description is given of a mobile body surroundings display apparatus 2 according to a second embodiment of the present invention. As illustrated in FIG. 7, the second embodiments differs from the first embodiment in that the mobile body surroundings display apparatus 2 includes an object detector 60 and an attention-required object identification unit 47 and does not include the driving scene determination unit 42, the attention-required range identification unit 43, and the storage unit 44. The same constituents as those in the first embodiment are denoted by the same reference numerals as used in the first embodiments and will not be described here. Different points will be mainly discussed below.

The object detector 60 is an object detection sensor that detects an object present around the host vehicle, and detects an object present in the periphery of a road on which the host vehicle is travelling. For example, a radar sensor can be used as the object detector 60. Examples of objects detected by the object detector 60 include mobile bodies such as a different vehicle, a motorcycle, a pedestrian, and a bicycle, traffic signals, and road signs. Note that the object detector 60 may be a sensor other than the radar sensor, and may be an image recognition sensor using an image captured by a camera. Also, a laser sensor, an ultrasonic sensor, or the like may be used as the object detector 60. The object detector 60 outputs information on detected objects to the attention-required object identification unit 47.

The attention-required object identification unit 47 identifies, among the objects detected by the object detector 60, an object to which an occupant needs to pay attention (hereinafter referred to as an attention-required object). Examples of an attention-required object include a different vehicle, a motorcycle, a pedestrian, a bicycle, an animal (like a dog or a cat), a telephone pole, an advertising display, a traffic light, a road sign, and a fallen object on a road. The attention-required object identification unit 47 outputs the identified attention-required object to the camera image creation unit 45 and the synthesis unit 46.

Figure 8:
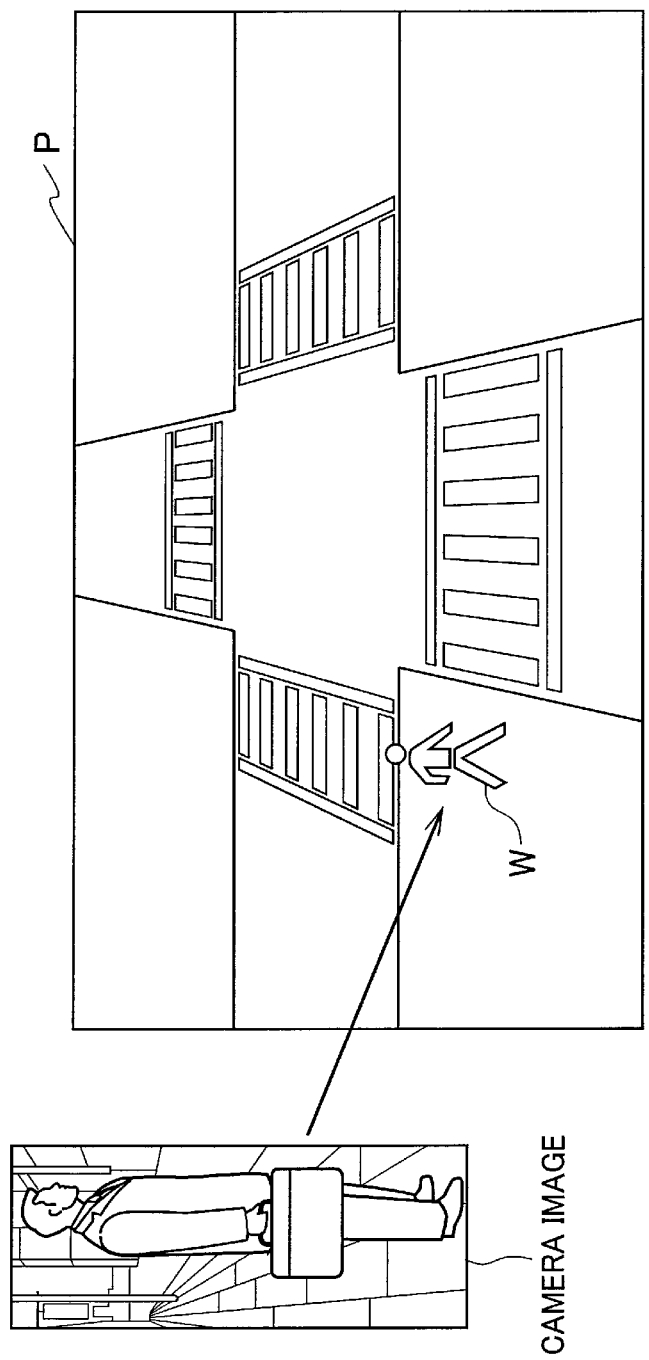
FIG. 8 is a diagram illustrating synthesis of a virtual image with a camera image according to the second embodiment of the present invention.

Next, with reference to FIG. 8, an example of camera image synthesis is described. As illustrated in FIG. 8, on a virtual image P, a pedestrian W is shown as a symbol. In this case, information such as the attribute of the pedestrian P (whether the pedestrian P is an elderly person or a child) and the direction of eye of the pedestrian P may be lost. Thus, the attention-required object identification unit 47 identifies the pedestrian W detected by the object detector 60 as an attention-required object, and the camera image creation unit 45 creates a camera image of the pedestrian W identified, as illustrated in FIG. 8. Then, the synthesis unit 46 replaces the pedestrian W on the virtual image P with the camera image. Thereby, the display 50 displays the pedestrian W to which an occupant needs to pay attention, using the camera image, i.e., an actual captured image. Thereby, the occupant can be informed of detailed information on the pedestrian W. Note that a camera image of an attention-required object created may be a camera image of a region including the pedestrian W as illustrated in FIG. 8, or a camera image cutting out the pedestrian W along the contour.

Figure 9:
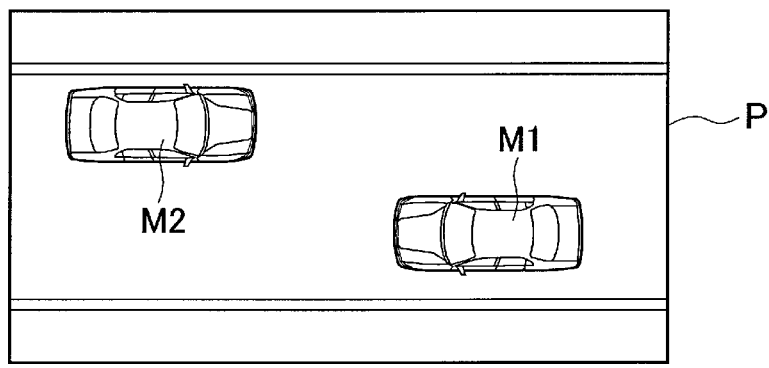
FIG. 9 is a diagram illustrating an example of synthesis of a virtual image with a camera image according to the second embodiment of the present invention.
Figure 10:
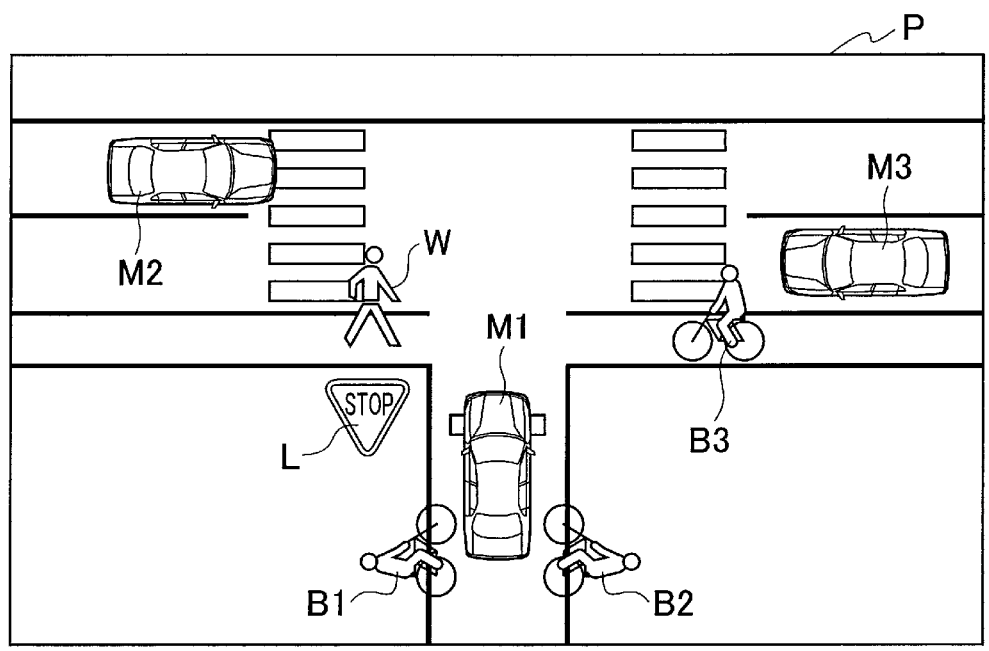
FIG. 10 is a diagram illustrating another example of synthesis of a virtual image with a camera image according to the second embodiment of the present invention.

Next, with reference to FIGS. 9 to 10, a description is given of examples of camera image synthesis for various driving scenes.

As illustrated in FIG. 9, when the object detector 60 detects a different vehicle M2 while a host vehicle M1 is travelling a narrow road, the attention-required object identification unit 47 identifies the different vehicle M2 as an attention-required object, and the camera image creation unit 45 creates a camera image of the different vehicle M2. The following processing is the same as that described in connection to FIG. 8, and will therefore not be described here.

Next, with reference to FIG. 10, a description is given of a situation where a host vehicle M1 enters a T intersection. When the object detector 60 detects different vehicles M2 and M3, a pedestrian W, bicycles B1 to B3, and a road sign L, the attention-required object identification unit 47 identifies these objects as attention-required objects, and the camera image creation unit 45 creates camera images of these objects. The following processing is the same as that described in connection to FIG. 8, and will therefore not be described here.

Figure 11:
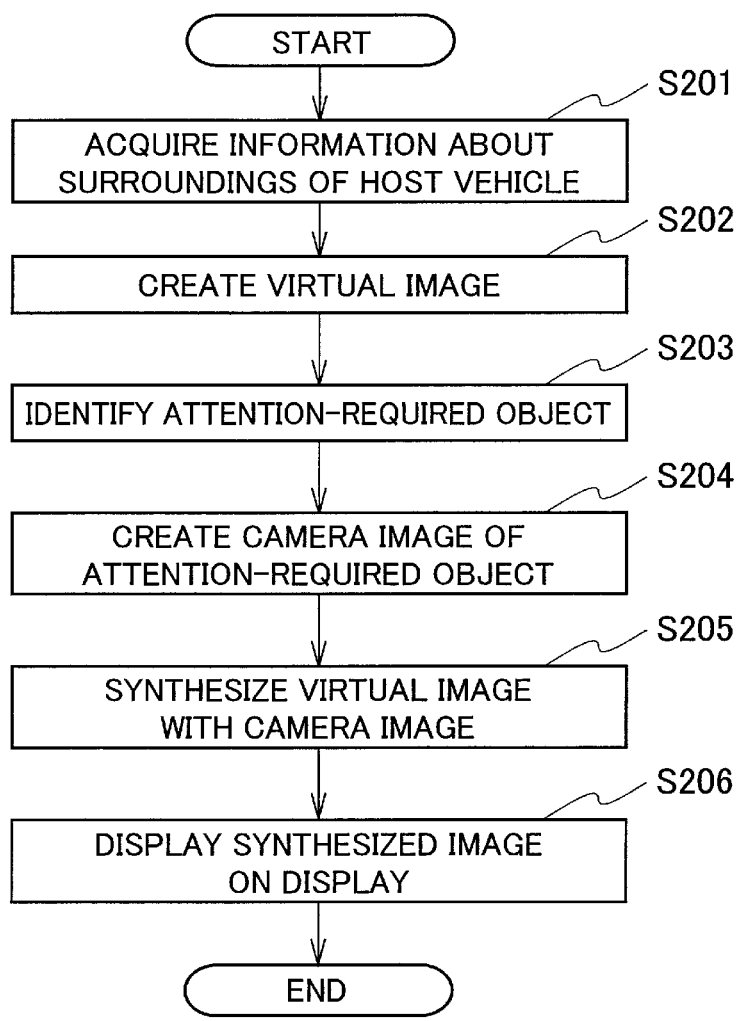
FIG. 11 is a flowchart illustrating an example operation of the mobile body surroundings display apparatus according to the second embodiment of the present invention.

Next, with reference to the flowchart in FIG. 11, an example operation of the mobile body surroundings display apparatus 2 is described. This flowchart is initiated when, for example, an ignition switch is turned on.

In Step S201, the environment detector 10 and the object detector 60 acquire information about the surroundings of the host vehicle.

In Step S202, the virtual image creation unit 41 creates a virtual image using the information about the surroundings of the host vehicle.

In Step S203, the attention-required object identification unit 47 identifies an attention-required object around the host vehicle.

In Step S204, the camera image creation unit 45 creates a camera image of the attention-required object identified by the attention-required object identification unit 47.

In Step S205, the synthesis unit 46 replaces the attention-required object on the virtual image with the camera image.

In Step S206, the controller 40 displays the synthesized image synthesized by the synthesis unit 46 on the display 50.

The mobile body surroundings display apparatus 2 according to the second embodiment as described above produce the following advantageous effects.

The mobile body surroundings display apparatus 2 first creates a virtual image using information about the surroundings of the host vehicle. Next, the mobile body surroundings display apparatus 2 identifies an attention-required object and creates a camera image of the attention-required object identified. Then, the mobile body surroundings display apparatus 2 replaces the attention-required object on the virtual image with the camera image, and displays the thus-synthesized image on the display 50. Thereby, an occupant can be informed of detailed information on the attention-required object.

On a virtual image, information on an attention-required object may be lost. For example, if a human is shown as a symbol, information such as the attribute of that person (whether the person is an elderly person or a child) and the direction of eye of the person may be lost. Further, if a vehicle is shown as a symbol, information such as the size, shape, and color of the vehicle may be lost. The mobile body surroundings display apparatus 2, however, displays an attention-required object on a virtual image after replacing it with a camera image, and thus can compensate for the loss of information which may be caused by image virtualization. Thereby, an occupant is more likely able to predict the motion of the attention-required object.

In addition, the mobile body surroundings display apparatus 2 can inform an occupant with detailed information on an attention-required object, such as a pedestrian, an animal, a bicycle, a vehicle, or a road sign, by displaying the attention-required object after replacing the attention-required object with a camera image.

Third Embodiment

Figure 12:
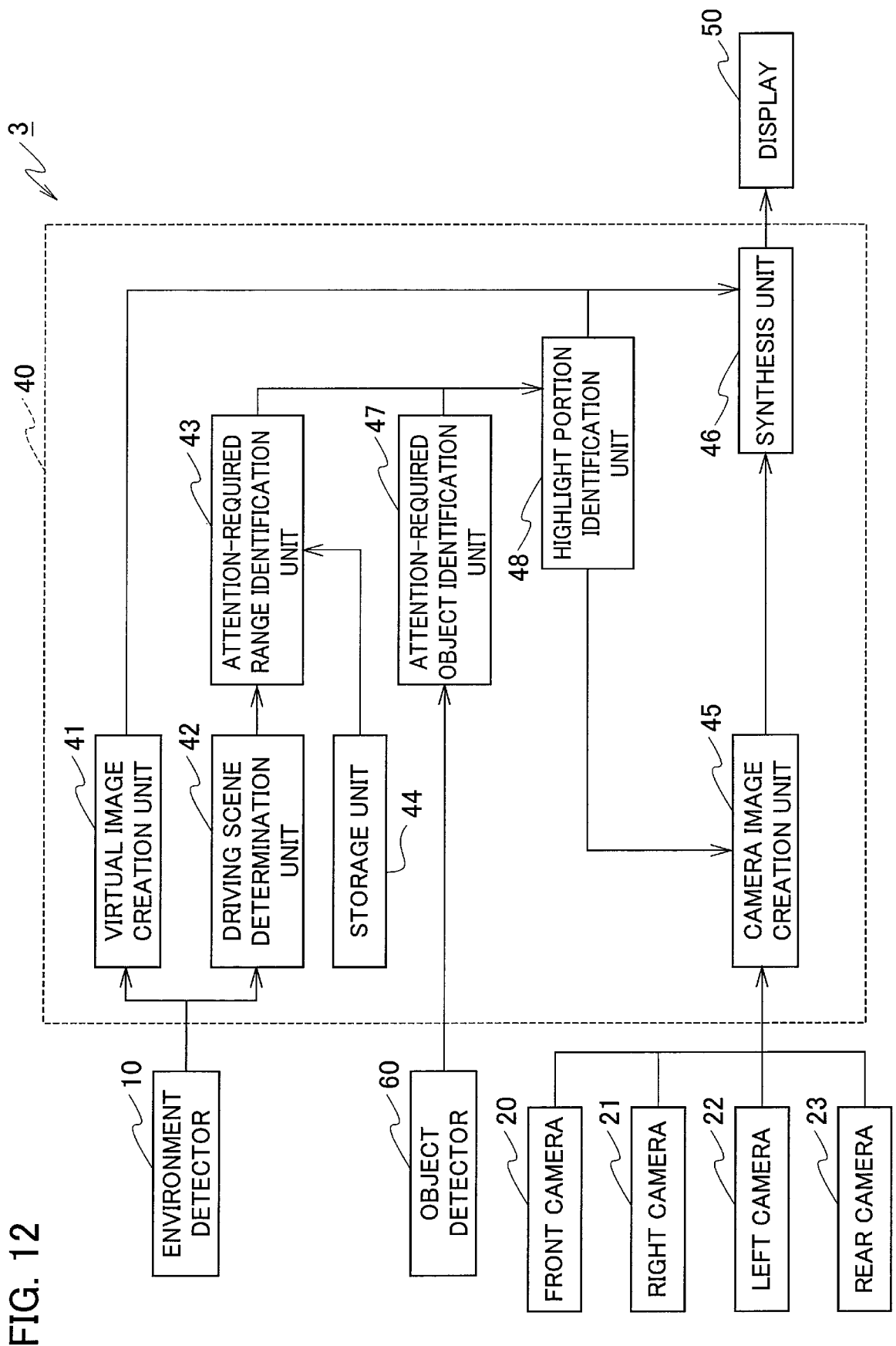
FIG. 12 is a diagram of the configuration of a mobile body surroundings display apparatus according to a third embodiment of the present invention.

Next, with reference to FIG. 12, a description is given of a mobile body surroundings display apparatus 3 according to a third embodiment of the present invention. The third embodiment differs from the first embodiment in that the mobile body surroundings display apparatus 3 includes the object detector 60, the attention-required object identification unit 47, and a highlight portion identification unit 48. The same constituents as those in the first embodiment are denoted by the same reference numerals as used in the first embodiment, and are not described below. Different points will be mainly discussed below. Note that the object detector 60 and the attention-required object identification unit 47 are the same as those described in the second embodiment, and will therefore not be described below.

The highlight portion identification unit 48 identifies a highlight portion to which an occupant needs to pay attention. Specifically, when an attention-required object identified by the attention-required object identification unit 47 is located within an attention-required range identified by the attention-required range identification unit 43, the highlight portion identification unit 48 identifies this attention-required object as a highlight portion. The highlight portion identification unit 48 outputs the identified highlight portion to the camera image creation unit 45 and the synthesis unit 46.

Figure 13:
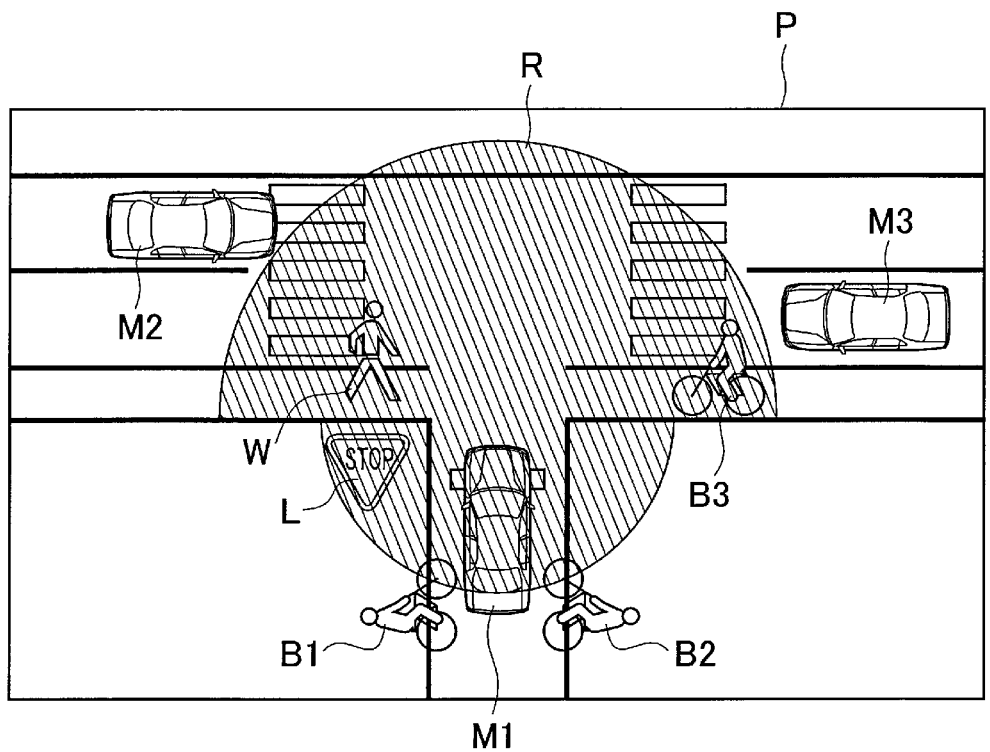
FIG. 13 is a diagram illustrating an example of synthesis of a virtual image with a camera image according to the third embodiment of the present invention.
Figure 14:
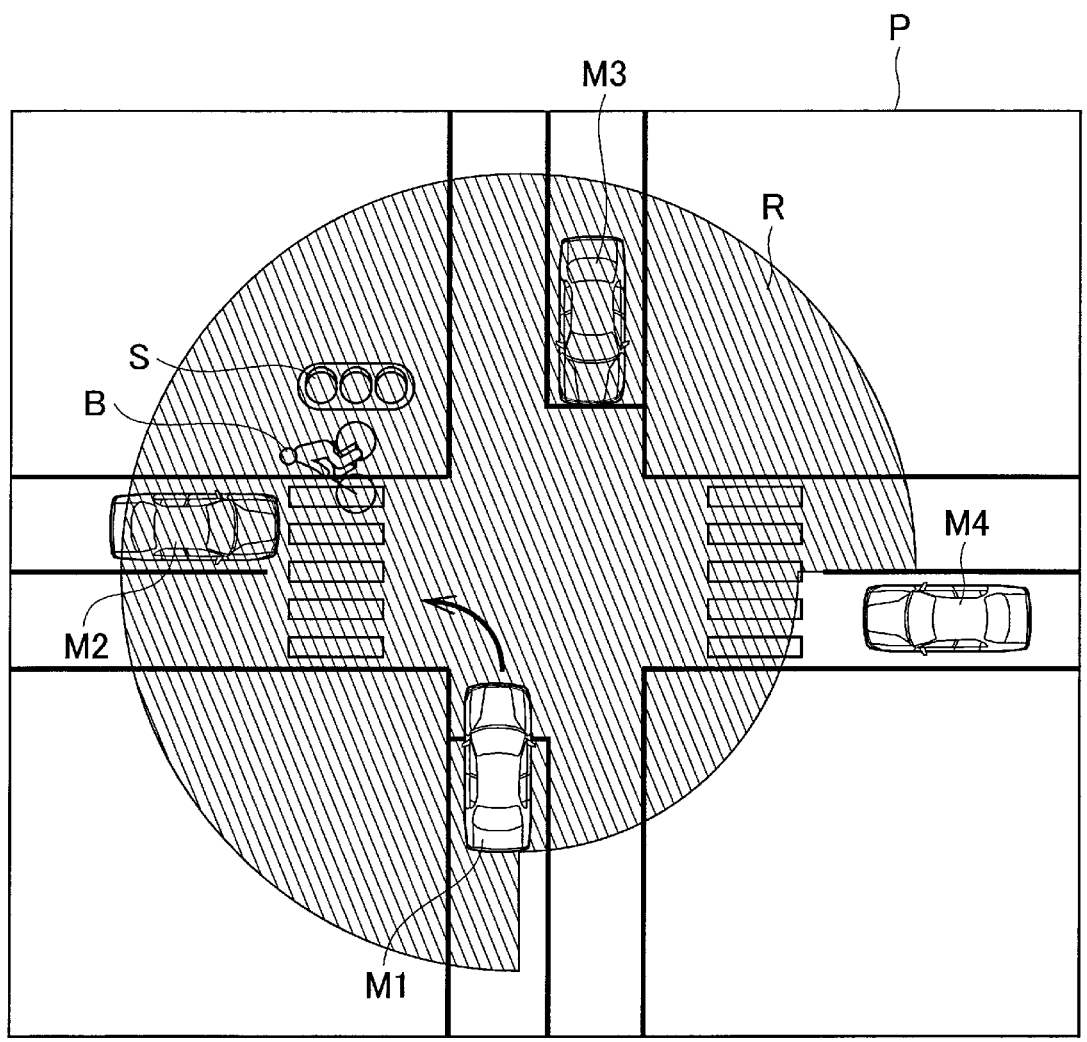
FIG. 14 is a diagram illustrating another example of synthesis of a virtual image with a camera image according to the third embodiment of the present invention.
Figure 15:
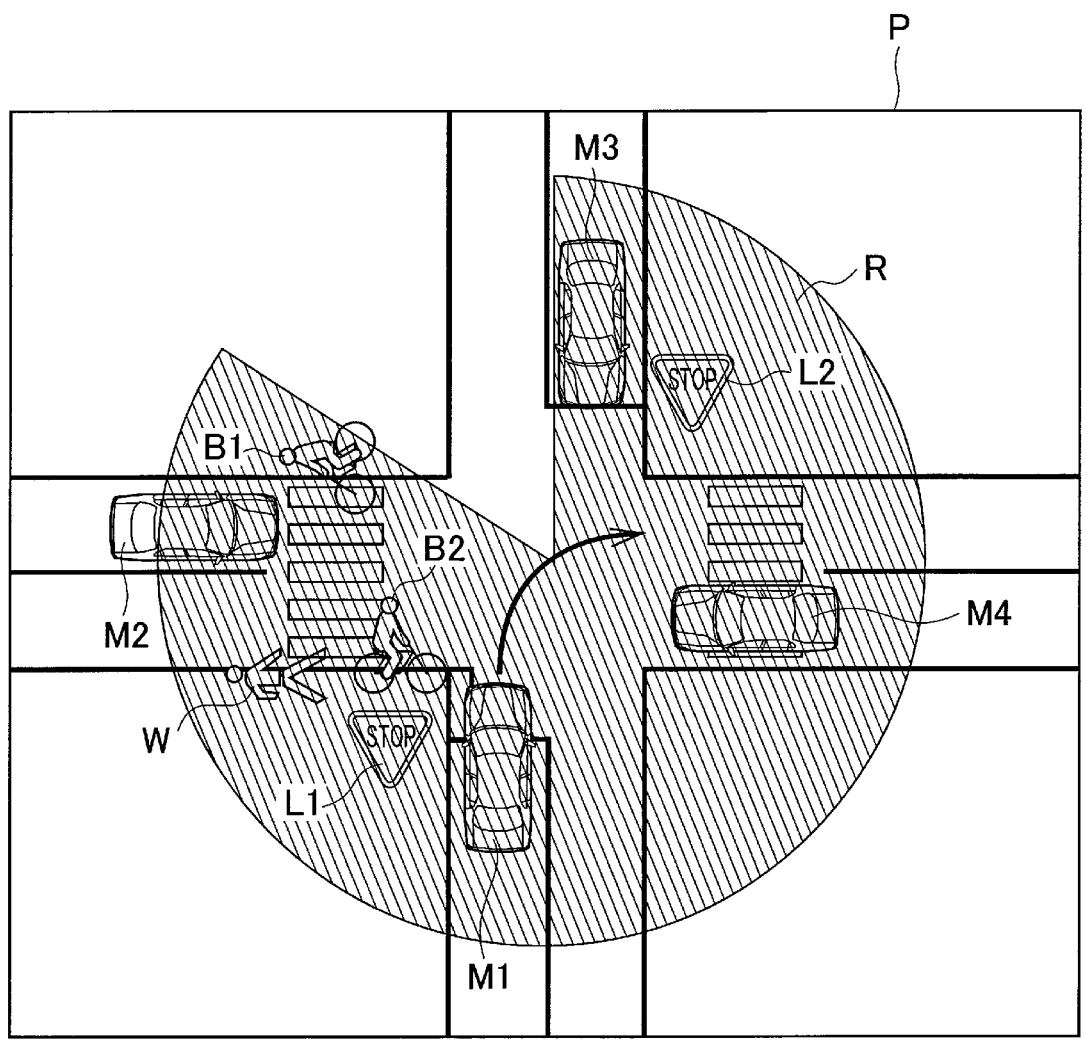
FIG. 15 is a diagram illustrating yet another example of synthesis of a virtual image with a camera image according to the third embodiment of the present invention.

Next, with reference to FIGS. 13 to 15, examples of camera image synthesis for various driving scenes are described.

First, with reference to FIG. 13, a description is given of a driving scene where a host vehicle M1 enters a T intersection. An attention-required range for a case of a T intersection is, as indicated by the region R, a region around the host vehicle including a range of the left and right sides of the center of the T intersection. The attention-required range identification unit 43 identifies the region R as an attention-required range. Next, the attention-required object identification unit 47 identifies different vehicles M2 and M3, a pedestrian W, bicycles B1 to B3, and a road sign L detected by the object detector 60, as attention-required objects. Next, out of the attention-required objects identified by the attention-required object identification unit 47, the highlight portion identification unit 48 identifies an attention-required object located within the range R as a highlight portion. In the example illustrated in FIG. 13, the highlight portion identification unit 48 identifies the pedestrian W, the bicycles B1 to B3, and the road sign L as highlight portions. Next, the camera image creation unit 45 creates camera images of the pedestrian W, the bicycles B1 to B3, and the road sign L identified as the highlight portions. Then, the synthesis unit 46 replaces the pedestrian W, the bicycles B1 to B3, and the road sign L on a virtual image P with the camera images. Thereby, the display 50 displays the pedestrian W, the bicycles B1 to B3, and the road sign L by use of the camera images, i.e., actual captured images. This allows an occupant to be informed of detailed information on the pedestrian W, the bicycles B1 to B3, and the road sign L. Note that, in the example illustrated in FIG. 13, an attention-required object which is partially located within the region R, such as the bicycles B2 and B3, is also identified as a highlight portion, but only an attention-required object which is entirely located within the region R may be identified as a highlight portion. Further, the attention-required range identification unit 43 may identify an attention-required range in real time, and attention-required ranges may be preset on a map or the like.

Further, the highlight portion identification unit 48 does not identify any highlight portion when no attention-required object is detected within the region R. When the highlight portion identification unit 48 does not identify any highlight portion, the synthesis unit 46 does not replace the region R on the virtual image P with a camera image.

The reason for this is that when no attention-required object, such as a different vehicle or a pedestrian, is detected in a region R, the risk of the host vehicle colliding is low, and there is low necessity of informing an occupant of the region R which has been replaced with a camera image. When no attention-required object is detected in a region R, the mobile body surroundings display apparatus 3 displays only the virtual image P and thus can reduce the amount of information given to an occupant. Consequently, the mobile body surroundings display apparatus 3 can bother an occupant less. Note that the object detector 60 may detect an object within an attention-required range identified by the attention-required range identification unit 43. Such limitation of the range to detect an object in can reduce the time it takes for the object detector 60 to detect an object. In turn, the time it takes for the attention-required object identification unit 47 to identify an attention-required object can be reduced, as well. In addition, the limitation of the range to detect an object in can lead to reduction in the processing load on the controller 40.

Next, with reference to FIG. 14, a description is given of a driving scene where a host vehicle M1 takes a left turn at an intersection. An attention-required range for a case of taking a left turn at an intersection is, as indicated with the region R, the entire region of the intersection, including the travelling direction (left-turn direction) of the host vehicle M1. The attention-required range identification unit 43 identifies the region R as an attention-required range, and the attention-required object identification unit 47 identifies different vehicles M2 to M4, a bicycle B, and a traffic light S as attention-required objects. Next, out of the attention-required objects identified by the attention-required object identification unit 47, the highlight portion identification unit 48 identifies an attention-required object located within the region R as a highlight portion. In the example illustrated in FIG. 14, the highlight portion identification unit 48 identifies the different vehicles M2 to M3, the bicycle B, and the traffic light S as highlight portions. The following processing is the same as that described in connection to FIG. 13, and will therefore not be described here. Note that as depicted in FIG. 14, the attention-required range can be set to suit a turning-left situation. When an attention-required range and outside of the attention-required range are thus set according to a travelling scene, a driving operation being currently exercised, a driving operation expected to be exercised in the future, and the like, the attention-required range identification unit 43 can set an attention-required range suitable for a travelling scene and a driving operation, and can make it less likely that attention is paid to the outside of the attention-required range.

Next, with reference to FIG. 15, a description is given of a driving scene where a host vehicle M1 takes a right turn at an intersection. An attention-required range for a case of taking a right turn at an intersection is, as indicated with the region R, the entire region of the intersection including the travelling direction (right-turn direction) of the host vehicle M1 and excluding the right side of the host vehicle. The attention-required range identification unit 43 identifies the region R as an attention-required range, and the attention-required object identification unit 47 identifies different vehicles M2 to M4, a pedestrian W, bicycles B1 and B2, and road signs L1 and L2 as attention-required objects. Next, out of the attention-required objects identified by the attention-required object identification unit 47, the highlight portion identification unit 48 identifies an attention-required object located within the region R as a highlight portion. In the example illustrated in FIG. 15, the highlight portion identification unit 48 identifies the different vehicles M2 to M4, the pedestrian W, the bicycles B1 and B2, and the road signs L1 and L2 as highlight portions. The following processing is the same as that described in connection to FIG. 13, and will therefore not be described here. Further, like in FIG. 14, the attention-required range identification unit 43 may set the attention-required range to suit a turning-right situation, as depicted in FIG. 15.

Figure 16:
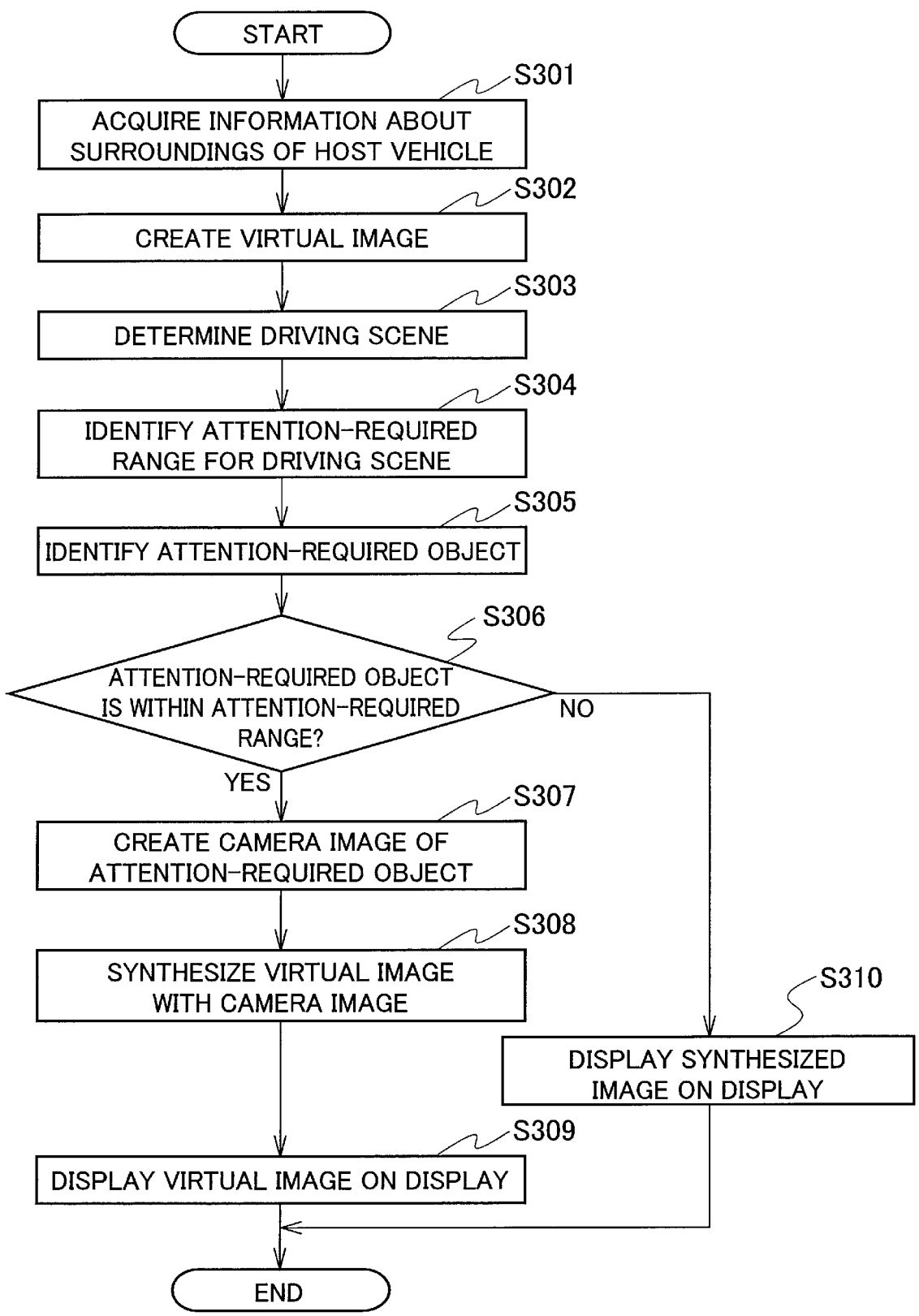
FIG. 16 is a flowchart illustrating an example operation of the mobile body surroundings display apparatus according to the third embodiment of the present invention.

Next, with reference to the flowchart illustrated in FIG. 16, a description is given of an example operation of the mobile body surroundings display apparatus 3. This flowchart is initiated when, for example, an ignition switch is turned on.

In Step S301, the environment detector 10, the object detector 60, and the vehicle cameras 20 to 23 acquire information about the surroundings of the host vehicle.

In Step S302, the virtual image creation unit 41 creates a virtual image using the information about the surroundings of the host vehicle.

In Step S303, the driving scene determination unit 42 determines a driving scene using the information about the surroundings of the host vehicle.

In Step S304, based on the driving scene determined by the driving scene determination unit 42, the attention-required range identification unit 43 identifies an attention-required range using the database in the storage unit 44.

In Step S305, the attention-required object identification unit 47 identifies an attention-required object around the host vehicle.

In Step S306, the highlight portion identification unit 48 determines whether an attention-required object is located within the attention-required range. When an attention-required object is located within the attention-required range (Yes in Step S306), the highlight portion identification unit 48 identifies the attention-required object located within the attention-required range, and the processing proceeds to Step S307. When no attention-required object is located within the attention-required range (No in Step S306), the processing proceeds to Step S310.

In Step S307, the camera image creation unit 45 creates a camera image of the attention-required object identified by the highlight portion identification unit 48.

In Step S308, the synthesis unit 46 replaces the attention-required object on the virtual image with the camera image.

In Step S309, the controller 40 displays the synthesized image synthesized by the synthesis unit 46 on the display 50.

In Step S310, the controller 40 displays the virtual image on the display 50.

The mobile body surroundings display apparatus 3 according to the third embodiment as described above can produce the following advantageous effects.

The mobile body surroundings display apparatus 3 first creates a virtual image using information about the surroundings of the host vehicle. Next, the mobile body surroundings display apparatus 3 identifies an attention-required range based on a driving scene and identifies an attention-required object within the attention-required range. The mobile body surroundings display apparatus 3 creates a camera image of the attention-required object within the attention-required range, replaces the attention-required object within the attention-required range on the virtual image with the camera image, and displays the thus-synthesized image on the display 50. Thereby, an occupant can be informed of detailed information on the attention-required object.

Further, the mobile body surroundings display apparatus 3 displays only the virtual image on the display 50 when no attention-required object is located within the attention-required range. Thus, the mobile body surroundings display apparatus 3 can reduce the amount of information given to an occupant. The mobile body surroundings display apparatus 3 can thus bother an occupant less.

Hereinabove, the embodiments of the present invention have been described. However, it should not be understood that the descriptions and drawings which constitute part of the disclosure limit the present invention. From this disclosure, various alternative embodiments, examples, and operation techniques will be easily found by those skilled in the art.

In the first and second embodiments, an attention-required range and an attention-required object, respectively, are replaced with a camera image. In the third embodiment, an attention-required object is replaced with a camera image if the attention-required object is located within an attention-required range. An attention-required range and an attention-required object indicate a range to which an occupant needs to pay attention, and an attention-required range and an attention-required object can collectively be rephrased as an attention-required range. In addition, as will be described later, an attention-required range can also include a region the level of attention of which is equal to or above a predetermined value.

In the first to third embodiments, an attention-required range is replaced with a camera image, but the present invention is not limited to this. For example, the mobile body surroundings display apparatuses 1 to 3 may calculate a level of attention for the host vehicle and perform the replacement according to the level of attention calculated. The level of attention for the host vehicle can be obtained based on a relative speed or a relative distance to the host vehicle. For example, the environment detector 10 and/or the object detector 60 may have the capability of detecting a relative speed and a relative distance to the host vehicle.

For example, the mobile body surroundings display apparatuses 1 to 3 may calculate and set a level of attention such that the higher the relative speed to the host vehicle, the higher the level of attention. Further, the mobile body surroundings display apparatuses 1 to 3 may set a level of attention such that the shorter the relative distance to the host vehicle, the higher the level of attention.

A specific description is given of a display method which is based on a level of attention. The mobile body surroundings display apparatuses 1 to 3 calculate a level of attention of an object located around the host vehicle, and when the level of attention calculated is equal to or above a predetermined value, create a camera image of a region where the object is located, replace that region on a virtual image with the camera image, and display the thus-synthesized image. Thereby, the mobile body surroundings display apparatuses 1 to 3 can inform an occupant of detailed information on a region to which attention needs to be paid, without identifying the attribute of the object (whether the object is a human or an animal) or the like. Note that the predetermined value can be obtained beforehand through experiment or simulation.

Also, the mobile body surroundings display apparatuses 1 to 3 may divide a virtual image into a plurality of parts, calculate a level of attention for each of regions corresponding to the respective divided parts of the image, and replace a region the calculated level of attention of which is equal to or above a predetermined value with a camera image. This way, the mobile body surroundings display apparatuses 1 to 3 can reduce the load for the attention level calculation.

Although the attention-required range identification unit 43 identifies an attention-required range using a databased stored in the storage unit 44, the present invention is not limited to this. For example, the attention-required range identification unit 43 may transmit information on the position of the host vehicle to a cloud, and identify an attention-required range using information from the cloud corresponding to the information on the position of the host vehicle. Also, the attention-required range identification unit 43 may identify an attention-required range using information acquired from a different vehicle through vehicle-to-vehicle communication.

Although the synthesis unit 46 of the present embodiments replaces an attention-required range on a virtual image with a camera image, the present invention is not necessarily limited to this. The synthesis unit 46 may generate a camera image around the host vehicle and replace a region other than an attention-required range with a virtual image. In other words, any approach may be implemented as long as an attention-required range is displayed by use of a camera image.

Note that each function of the foregoing embodiments may be implemented by one or a plurality of processing circuits. A processing circuit includes a programmed processing device such as a processing device including an electric circuit. A processing circuit includes a device such as an application-specific integrated circuit (ASIC) adapted to execute functions described in the embodiments or a conventional circuit component.

REFERENCE SIGNS LIST

10 environment detector
20 front camera
21 right camera
22 left camera
23 rear camera
40 controller
41 virtual image creation unit
42 driving scene determination unit
43 attention-required range identification unit
44 storage unit
45 camera image creation unit
46 synthesis unit
47 attention-required object identification unit
48 highlight portion identification unit
50 display
60 object detector

The invention claimed is:

1. A mobile body surroundings display method performed by a mobile body surroundings display apparatus including an image capturing element that is mounted on a mobile body and acquires surroundings information by image capturing, a controller that creates a captured image using the surroundings information and a virtual image representing a situation around the mobile body, and a display that displays the virtual image, the method comprising:
dividing the virtual image around the mobile body into a plurality of parts, calculating a level of attention for each of regions corresponding to the divided parts of the virtual image, and detecting a region the level of attention of which is equal to or above a predetermined value, as an attention-required range;
creating the captured image of the attention-required range;
displaying the attention-required range by use of the captured image, wherein the captured image is an actual captured image, and the virtual image is different from the actual captured image and is created such that information contained in the image is less than that of the actual captured image; and
displaying a synthesized image in which the attention-required range on the virtual image is replaced with the actual captured image on the display, wherein the virtual image is a computer graphic image representing the surroundings information of the mobile body.

2. The mobile body surroundings display method according to claim 1, wherein the attention-required range is a region on a road where a vehicle and a vehicle or a vehicle and a person travel across each other.

3. The mobile body surroundings display method according to claim 1, comprising:
detecting an attention-required object around the mobile body;
when detecting the attention-required object, detecting a region including the attention-required object as the attention-required range; and
displaying the attention-required range by use of the captured image.

4. The mobile body surroundings display method according to claim 1, comprising:
detecting an attention-required object around the mobile body within the attention-required range;
when detecting the attention-required object within the attention-required range, detecting a region including the attention-required object as a highlight portion; and
displaying the highlight portion by use of the captured image.

5. The mobile body surroundings display method according to claim 3, wherein the attention-required object is a pedestrian, an animal, a bicycle, a vehicle, or a road sign located around the mobile body.

6. A mobile body surroundings display apparatus comprising:
an image capturing element that is mounted on a mobile body and acquires surroundings information by image capturing;

a controller that creates a captured image using the surroundings information and a virtual image representing a situation around the mobile body; and a display that displays the virtual image, wherein:

the controller divides the virtual image around the mobile body into a plurality of parts, calculates a level of attention for each of regions corresponding to the divided parts of the virtual image, detects a region the level of attention of which is equal to or above a predetermined value, as an attention-required range, creates the captured image of the attention-required range detected, and displays the captured image of the attention-required range on the display;

the captured image is an actual captured image;

the virtual image is different from the actual captured image and is created such that information contained in the image is less than that of the actual captured image;

the controller displays a synthesized image in which the attention-required range on the virtual image is replaced with the actual captured image on the display; and the virtual image is a computer graphic image representing the surroundings information of the mobile body.

* * * * *